US007636853B2

(12) United States Patent
Cluts et al.

(10) Patent No.: US 7,636,853 B2
(45) Date of Patent: Dec. 22, 2009

(54) AUTHENTICATION SURETY AND DECAY SYSTEM AND METHOD

(75) Inventors: Jonathan C. Cluts, Sammamish, WA (US); Sven Pleyer, Woodinville, WA (US); Pamela J. Heath, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 648 days.

(21) Appl. No.: 10/354,589

(22) Filed: Jan. 30, 2003

(65) Prior Publication Data

US 2004/0153656 A1 Aug. 5, 2004

(51) Int. Cl.
    *G06F 21/00* (2006.01)
(52) U.S. Cl. .......................................... 713/186; 726/9
(58) Field of Classification Search .................. None
    See application file for complete search history.

(56) References Cited

U.S. PATENT DOCUMENTS

| | | | | |
|---|---|---|---|---|
| 6,115,709 | A * | 9/2000 | Gilmour et al. ................. | 707/9 |
| 6,295,605 | B1 | 9/2001 | Dockter et al. | |
| 6,668,322 | B1 * | 12/2003 | Wood et al. ................... | 713/182 |
| 6,857,073 | B2 * | 2/2005 | French et al. ................. | 713/168 |
| 7,028,191 | B2 * | 4/2006 | Michener et al. ............. | 713/182 |
| 7,039,951 | B1 * | 5/2006 | Chaudhari et al. ............ | 726/7 |
| 7,086,085 | B1 * | 8/2006 | Brown et al. .................. | 726/7 |
| 7,107,449 | B2 * | 9/2006 | Mont et al. .................... | 713/175 |
| 7,137,008 | B1 * | 11/2006 | Hamid et al. .................. | 713/182 |
| 7,216,361 | B1 * | 5/2007 | Roskind et al. ................ | 726/9 |
| 7,434,063 | B2 * | 10/2008 | Watanabe ..................... | 713/186 |
| 2001/0047485 | A1 | 11/2001 | Brown et al. | |
| 2002/0087858 | A1 * | 7/2002 | Oliver et al. .................. | 713/156 |
| 2003/0074209 | A1 * | 4/2003 | Tobin ............................. | 705/1 |
| 2003/0229782 | A1 * | 12/2003 | Bible et al. ................... | 713/155 |
| 2004/0083394 | A1 * | 4/2004 | Brebner et al. ............... | 713/202 |
| 2004/0148526 | A1 * | 7/2004 | Sands et al. ................... | 713/202 |

FOREIGN PATENT DOCUMENTS

WO    WO 01/22201 A1    3/2001

OTHER PUBLICATIONS

Yesberg, J.D. et al., "QuARC: Expressive Security Mechanisms," *New Security Paradigms Workshop* Proceedings La Jolla, CA, USA., 1995, pp. 34-40.
Al-Kahtani, Mohammad et al., "A Model for Attribute-Based User-Role Assignment," ACM, Dec. 9, 2002, pp. 353-362.
Herzberg, Amir et al., "Access Control Meets Public Key Infrastructure, Or: Assigning Roles to Strangers," Security and Privacy, 2000, May 14, 2000, pp. 2-14.
Liu, Ping, "The Design and Implementation of a Reference Monitor for the 2K Operating System," INET, 1999, pp. 12-13.

* cited by examiner

*Primary Examiner*—Emmanuel L Moise
*Assistant Examiner*—David J Pearson
(74) *Attorney, Agent, or Firm*—Shook, Hardy & Bacon L.L.P.

(57) ABSTRACT

The present invention is directed to a method and system for use in security authentication in a network environment. The present invention enables shared security information by networked devices. It also allows access to networked devices on the basis of authentication surety. The system assigns surety levels on the basis of the modes and methods of user authentication to the network. Further, the present invention allows the gradual decay, of user authentication and thus access to networked devices over time. Further still, the present invention distinguishes between individual identities and personas within the network environment. Surety levels associated with an authentication provide a predetermined level of access to networked devices or device features. The present invention provides improved security and diminishes the risk of fraudulent access to a network via identity theft.

14 Claims, 6 Drawing Sheets

AUTHENTICATION SURETY AND DECAY SYSTEM AND METHOD

CROSS-REFERENCE TO RELATED APPLICATIONS

None.

TECHNICAL FIELD

The present invention relates to computing environments. More particularly, the invention is to directed to a system and method for security authentication. The present invention provides for and enables access based on surety levels of various identification means and further decays the surety level and thus security access over time.

BACKGROUND OF THE INVENTION

Login and password protected access to systems and devices is well-known in a number of different environments. For example, devices that require a user to input or otherwise provide alphanumeric characters for identification have been used for some time. Additionally, devices such as building security systems that require some form of biometric identification to permit access also exist. But these devices act in isolation and not in concert. As communication evolves, the number of networked devices is slowly increasing. It would be desirable to leverage this network of devices in new and convenient ways. In other words, it would be desirable to utilize networked devices without repeated authentication at each device, while also diminishing the possibility of identity theft.

A more specific need exists with regards to the close tie of security models to an access point. It would be desirable to increase the scope of security models to cover an entire network including specific devices on the network. For example, current security systems only allow access from the single access point where the user provided their system identification. When a user logs in to a network at a computer terminal, they can only perform functions relating to or on that network at the single terminal. They would otherwise have to re-identify themselves at other terminals or devices to gain access to those terminals or devices. While this may seem logical in most environments, it is particularly cumbersome in a setting such as a home. When a user is granted access into the home on the basis of some authentication at the door, the user should not have to further identify themselves to other commonly shared, secure and networked devices within the home, such as a personal computer. The home should 'know' that the user is present and thus provide access to a limited set of functions, features and applications on the personal computer on the basis of that knowledge.

An even further need exists with regards to security models that treat all logins or system identification the same. That is, current security models assign equal levels of surety to all logins, regardless of the location, the method of identification or elapsed time since the authentication of a user. To the extent that there are numerous ways of logging into or otherwise identifying an individual to a system, these variations should be recognized and at least factored in by secure systems. Systems should account for the fact that each of the login methods provide differing certainty. In other words, some login methods are more susceptible to identity fraud and thus should not be accorded the same authentication surety as others. Furthermore, after a user has logged into a network system such as the home, the system should account for the possibility that as time passes, the user may have left the building or the immediate vicinity of the last authentication. As such, the system needs to be able to diminish the level of surety associated with an authentication as time elapses.

In light of the foregoing, there exists a need to provide a system and method that could enable different levels of security to be associated with a user's method of identification to a system. Furthermore, there exists a need for a system and method to diminish security access to system components or options, as a function of both time and the mode of user identification to the system. In other words, there exists a need for a system and method where a user's access to devices, and applications or certain properties of those devices, is determined by the degree of certainty or surety the system has that the user is who they claim to be. Furthermore, these access rights should not remain indefinitely, but vary over an appropriate duration of time.

SUMMARY OF THE INVENTION

The present invention is directed to a method and system for use in a computing environment for maintaining and providing secure access to a number of networked devices.

In one aspect, the present invention is directed to accepting user identification, assigning a surety level to the identification and utilizing the combined information to grant appropriate access to networked devices and their features.

In a further aspect, the present invention associates a surety level with the method and authentication device utilized by a user to provide his/her identification to the network.

In another aspect, the present invention decays user authentications as a function of elapsed time, the method of user identification to the system or the location of more recent authentications within the network environment.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means, instrumentalities and combinations particularly pointed out in the appended claims.

BRIEF DESCRIPTION OF THE SEVERAL VIEWS OF THE DRAWING

These and other objectives and advantages of the present invention will be more readily apparent from the following detailed description of the drawings of the preferred embodiment of the invention that are herein incorporated by reference and in which.

DETAILED DESCRIPTION OF THE INVENTION

The present invention provides a system and method for establishing the quality and surety of identifications to a system of networked devices. Security is linked to the entire network rather that to individual access points on the network. Varying levels of authentication surety are assigned according to the mode of identification utilized by a user. Access to networked devices or device features is controlled by the authentication levels. Authentication levels do not persist over time, but rather are subject to decay based on several factors, including the length of time since the last authentication, the surety of the method of authentication, the location of the last authentication and new authentications at a device.

The system and method of the present invention comprises several different components which together provide an authentication and surety system briefly summarized above. Through each of the components, the quality and surety of a currently identified individual or persona to network devices can be ascertained. For example, in a controlled network of devices such as a home network with lights, televisions, computer systems, microwaves and other electronic devices, the system and method of the present invention could track whether or not an identity is in a given space and how certain it is of that fact. Based on this certainty, the system will grant or deny access to devices and device features. An individual's access to networked devices must be at an appropriate level, at the time of attempted access. The system accounts for both level of authentication and the quality or trustworthiness of the authentication method.

While there are multiple modes for logging in or identifying an individual to a system such as text passwords, fingerprints, smart cards, and so forth, the level of accuracy or trustworthiness of each of these modes are different. For example, a fingerprint is much more secure than a text password, but not as secure as an iris scan. The present invention allows varying levels of authentication to be tracked and assigned based on the quality/trustworthiness of the identification method. For example, if a user "Joe" logged on to a Personal Computer (PC) using a text password, the system might set a value of 50 percent certainty that it is truly Joe that is using the computer. A text password level of certainty may grant the user access to Joe's desktop and web surfing application. However, if the user tried to access Joe's Microsoft Money account, the system could require a much higher level of surety that this user is indeed Joe. For example, a surety level of 90 percent may be required to access confidential or financial information. As such, the system would prompt the user to utilize another method of login that could provide the needed 90 percent surety level, before granting access to the Microsoft Money account. Such a login method could include a smart card, fingerprint or some other more secure mode of identification. Since the system can track a range of surety levels that are required to access various content or services on the computer and network, the user can then also access other 'high surety level' functions on the computer or devices on the network.

In a further aspect of the present invention, the system also allows the levels of authentication to be aggregated and shared among devices on the network. For example, when a user has been identified by an iris scanner at a front door, not only is the user granted access to the home by unlocking the door, but access could also be granted to any networked devices or features, for which the associated authentication level of an iris scan is appropriate e.g. the user's e-mail messages. An aggregation of authentication surety levels is performed by the system resulting in the highest most recent surety level being set as the current surety level for a user on the network. Since an iris is very unique, in fact about one thousand times more so than a fingerprint, there is a high level of confidence that an authentication based on an iris scan of a user is in fact genuine. In other words, the system can be sure that User X is in the home. When User X accesses a light switch connected on the network, the system uses the information that there is a high level of surety that User X is in fact in the home and thus provides notification that the User X has e-mail waiting. Additionally, as the user goes to the television, which is also on the network, there is an automatic sort of show listings and internet content in an order that is specific to User X. This action is achieved without User X having to be individually provide an identification to the television.

As the user moves around the house or lingers, without being re-identified by any of the devices or systems within the home, the system could slowly decay the amount of surety that the network has concerning the particular user's presence and authentication. If at any time the surety level of that user falls below a level that is necessary to access some service or content, the system may prompt the user as needed to re-identify and authenticate themselves in order to gain access. In other words, access to service or content is limited or denied until the network has an appropriate level of surety. An example might be an adult user watching television after entering the home via authentication of the front door iris scanner. If the user immediately accesses some "R" rated content requiring a 90 percent surety value, the user may simply be able to do so from a menu and have it begin playing. However, if the user sits and watches some broadcast "G" rated television show long enough without any re-identification, the system authentication surety may have decayed considerably, e.g. to 70 percent surety. If after this elapsed time period, the user is ready to access an "R" rated movie a re-identification would be required because the surety level has decayed below 90 percent.

Having briefly provided this overview of the present invention, the details of the authentication, assignment of surety levels to authentication, sharing of authentication levels and decay of authentication levels will now be discussed in detail with reference to FIGS. 1 through 4B.

An exemplary operating environment for the present invention is first described below.

Exemplary Operating Environment

Figure 1:
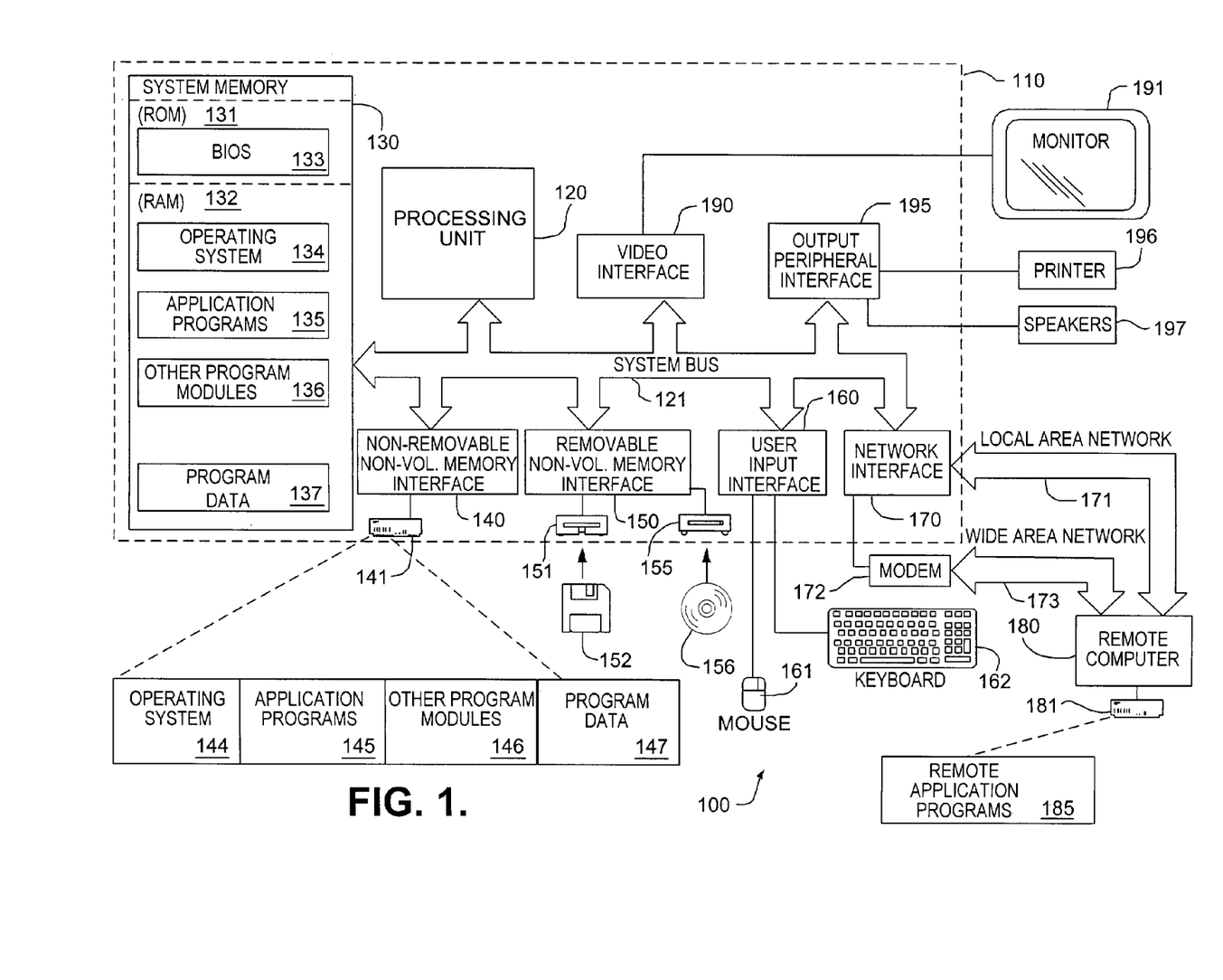
FIG. 1 is a block diagram of a computing system environment.

Referring to the drawings in general and initially to FIG. 1 in particular, wherein like reference numerals identify like components in the various figures, an exemplary operating environment for implementing the present invention is shown and designated generally as operating environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with a variety of computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system 100 for implementing the invention includes a general purpose computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. Examples of computer storage media include, but are not limited to, RAM, ROM, electronically erasable programmable read-only memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Typically, the operating system, application programs and the like that are stored in RAM are portions of the corresponding systems, programs, or data read from hard disk drive 141, the portions varying in size and scope depending on the functions desired. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 in the present invention may operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

When the computer 110 is turned on or reset, the BIOS 133, which is stored in the ROM 131 instructs the processing unit 120 to load the operating system, or necessary portion thereof, from the hard disk drive 140 into the RAM 132. Once the copied portion of the operating system, designated as operating system 144, is loaded in RAM 132, the processing unit 120 executes the operating system code and causes the visual elements associated with the user interface of the operating system 134 to be displayed on the monitor 191. Typically, when an application program 145 is opened by a user, the program code and relevant data are read from the hard disk drive 141 and the necessary portions are copied into RAM 132, the copied portion represented herein by reference numeral 135.

System and Method for Authentication Surety And Decay

Figure 2A:
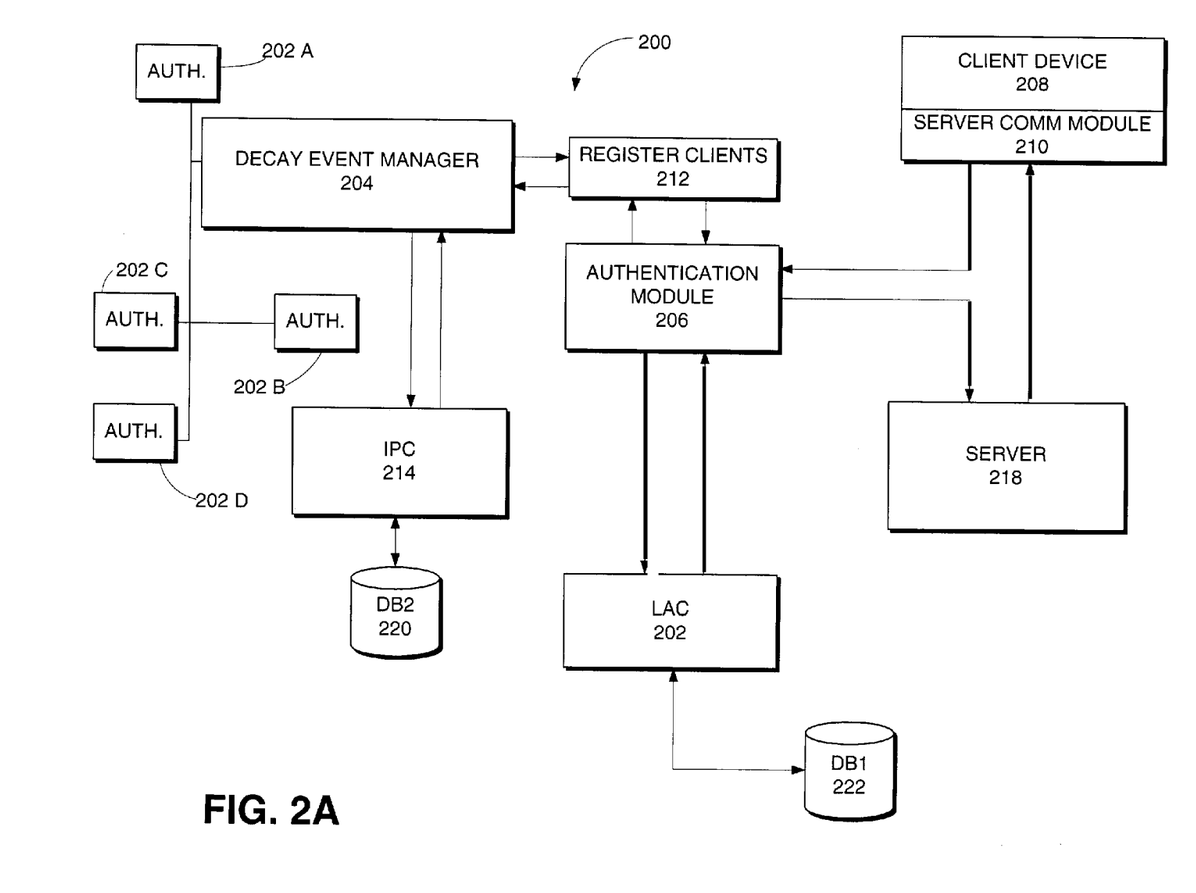
FIG. 2A is a schematic block diagram representing illustrative components of the present invention.

The method and system of the present invention evaluates both quality and surety of identity as provided by information received through a network of authentication devices. This evaluation is used to establish levels of authentication for use by applications and networked devices. The initial discussion herein will focus on the basic components of the system as shown in FIG. 2 and the use of these components discerning authentication levels and providing access to networked devices. The acquisition and tracking of authentication and surety will then be discussed with reference to FIGS. 3A and 3B. Access to surety levels by network devices will be discussed with reference to FIGS. 4A and 4B. It should be understood that the examples provided herein are merely one possible use of the invention's system and method and that the examples are not intended to be limiting in any way.

An Authentication System 200 incorporating the basic features of the present invention is shown schematically in FIG. 2. The system and method of the present invention requires that users are first identified in some fashion to Authentication System 200. Authentication Devices 202A, 202B, 202C and 202D, generally referenced as 202, accept and process information for identifying an individual to the Authentication System 200. An Authentication Device 202 can include among typical devices, smart cards and a host of biometric devices, such as iris scanner, thumb print reader or voice recognition systems. It can also include a standard keyed input device. It should be noted that the type of Authentication Device 202 or the method of user input affects the degree of surety that a particular user is who they claim to be. Authentication devices can be either passive or active devices. For example, iris scanners and fingerprint scanners are active in such that they are always "alive" and notify the authentication system upon authentications, at any time. Passive authentication devices need to be instructed by the authentication system to authenticate or to become alive. For example, a keyboard password entry is a passive device driver which may be instructed by the authentication system to prompt the user for a password. In other words, different levels of surety can be assigned as a function of the device or method used for identification. This function, involving levels of surety and access, will be discussed in detail later in this document.

Generally speaking, authentication information passes from the Authentication Device 202 to a Decay Event Manager 204. Decay Event Manager 204 handles authentications and also registers networked user devices. Decay Event Manager 204 is typically a module that is capable of maintaining user identities and decaying the authenticity surety of such identities over time. A Client Registry Module 212 provides and queries information from Decay Event Manager 204, as well as Authentication Module 206. Client Registry Module 212 facilitates the logging and registration of networked devices that are subject to and compliant with the authentication rules of the present system. The modules discussed and shown in FIG. 2B can be implemented in a computer such as shown in FIG. 1.

An aspect of the present invention is a distinction between a user identity and a persona. As used herein, a persona refers to an individual operating in a given role or mode. An individual can have only one identity, but multiple personas, and that identity supercedes personas. For example, a typical individual user has a work place persona, a home persona and possibly a community persona. In other words, there are several available roles for a user. The present invention recognizes and is able to appreciate the distinctions between each of these personas with regards to the types of devices, applications or features that can be accessed by each persona. For instance, a text password login might only provide access to and enable only the home persona of a user. The smart card or office ID badge may be required to identify the work place persona. No access to work e-mails will thus be granted to the user when identification is provided through a textual password. To that end, the present invention includes an Identity Persona Community (IPC) 214. IPC 214 communicates and interacts with Decay Event Manager Module 204 to appropriately associate an authentication with a persona. Information relating to authentication and personas are stored in a Security Database (DB2) 220. Security Database 220 contains information that is typical to most security systems, in addition to persona cross-reference information. Authentication devices may authenticate an individual either as an identity or as a persona. It is then up to the IPC and the information stored in the database to authenticate the individual accordingly. For example, an iris scanner may authenticate an individual using his/her identity. Because an identity can represent one or more personas, the system should not equally assign an authentication level to all personas. For example, while an iris authentication may grant an individual full access to personal e-mail and finances, it may not want to grant access to work related information. The information on how to distribute levels across personas is stored in the database. On the other hand, smart card readers for example, may authenticate only specific personas, like the work persona, and not identity.

Having received and stored authentication and security information, the system and method of the present invention enables networked devices to access and share that information. Examples of networked devices that utilize the authentication information include personal computers, television sets, light fixtures, microwave ovens and any other electronic device that is able to communicate over a network. Such devices are represented as Client Device 208. In a further aspect of the present invention, authentication level verification against access requests are location specific. There is no combined surety level for an identity or persona. Surety level is location specific and access is granted accordingly. For example, a child may have full access to changing light intensities as long as the child is in the same room. However, the request may be rejected/denied if he/she is not in the room or in the house.

A Client Device 208 can include a Server Communication Module 210 that facilitates communication to the previously described authentication information and also to a Server 218. Access to authentication information is provided through an Authentication Module 206. Authentication Module 206 communicates with Decay Event Manager 204, Register Clients Module 212 and a Location Access Control Module (LAC) 216.

LAC 216 facilitates and coordinates information related to device access and manages property roles. LAC 216 further handles information concerning the physical location of Authentication Devices 202 in reference to Client Devices 208. For example, in the event that a user has attempted to access a particular Client Device 208 and is unable to do so because they have either not yet identified themselves to the system or the authentication level has decayed beyond an acceptable level for the device, LAC 216 is able to provide information to the user directing them to an Authentication Device 202 that is both within close proximity of the Client Device 208, and that could provide the appropriate level of authentication. Authentication events that occur on the network along with the time of the event, location of the event and the authentication level associated with the event are managed and processed by LAC 216.

Figure 2B:
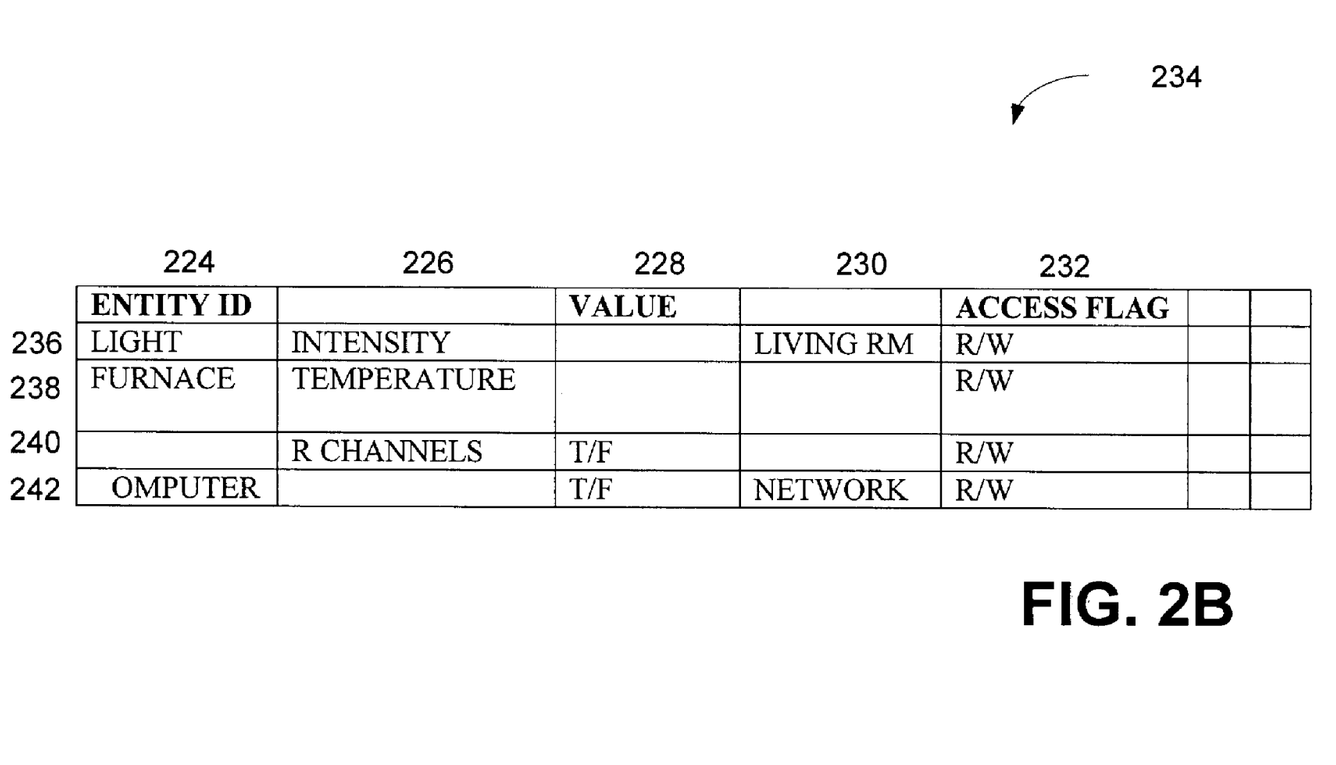
FIG. 2B is a diagram of an exemplary data table of information utilized by the present invention.

A Database (DB1) 222 provides storage for the information necessary to enable the functions of the current system. As would be understood by those skilled in the art, such data storage can be spread across multiple databases, computing systems or data tables. Information stored in DB1 222 includes a property information structure 234 (shown in FIG. 2B) that is utilized by the various modules of the current system. An exemplary table containing data of a Property Information Structure 234 is shown in FIG. 2B. The Property Information Structure 234 contains records 236-242 of information relating to Client Devices 208 and their features, herein referred to as entities and properties. An exemplary record of the property information structure can include the following: an entity ID 224, such as a light, furnace or television, a Property 226 such as in the case of the light intensity or in the case of the furnace, a temperature setting. A Value 228 can be associated with either of these properties, for example, an actual percentage of intensity in the case of the light, or a temperature value in the case of the furnace. Authentication Flags 232 designate the access that a user would have to a particular property within the record, such access includes read or write only. The Location 230 of an entity or device also forms a part of the Information Structure 234. The use of this property Information Structure 234 will be discussed in detail later in this document with reference to FIG. 4.

Figure 3A:
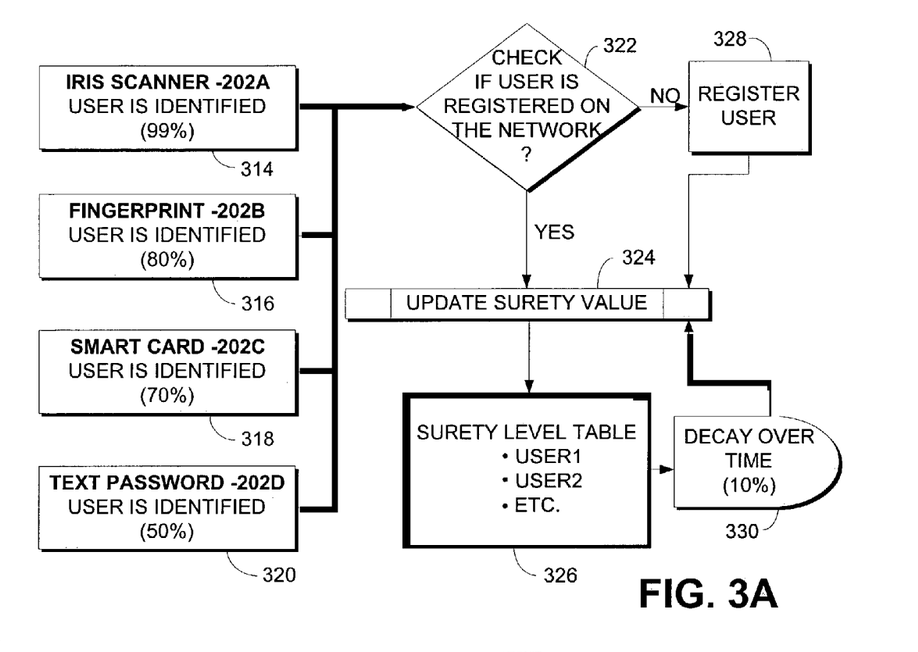
FIG. 3A is a schematic flow diagram representing a method of tracking authentication and surety of users.

In an exemplary use of the system, the schematic flow diagram of FIG. 3A displays the process for tracking authentication and surety of users. The process begins with a variable percentage value being assigned to a user's authentication or identification to the system, rather than the typical binary value of existing security systems. Conventional security systems assign a binary value to a user authentication indicating a successful or failed login. As previously described, a user identifies their presence to the system with various Authentication Devices 202. Identification is accomplished by providing an initial input to the system. Such input can be provided through a plurality of existing or future input devices or systems 202, such as, an Iris Scanner 202A, a Fingerprint Reader 202B, a Smart Card Pin Number 202C, or a Text Password 202D. As would be appreciated by one skilled in the art, the accuracy and the error/fraud susceptibility of each of these input methods varies greatly. As such, each input method has an authentication surety value. Each surety value is indicative of the certainty of identification provided by each input method. Accordingly, This Scanner 202A, which has the highest certainty of identification, is assigned a surety value of 99, at step 314. Fingerprint Reader 202B, Smart Card 202C and Text Password 202D have surety values of 80, 70 and 50 respectively assigned, corresponding to their identification certainty at steps 316, 318, and 320. It should be noted that the percentage values of surety represented by the previously specified identification modes are merely exemplary and are provided for the purpose of facilitating the discussion and conveying the fact that identification modes differ and some are better or less susceptible to fraud.

After input has been provided by a user, there is a check conducted at step 322 to determine if that user is actually registered on the network. If the user is not registered, a registration process occurs as shown at step 328. If on the other hand, the user is already registered to the network, then at step 324, the value associated with the surety that the user is who they claim to be is then updated. The registration of a user at step 328 also culminates in an update of surety value at step 324. Updating surety values involves making entries into a surety level table 326. This process involves a number of fields within a surety level table, which are populated with a user identification and an associated surety level value.

Figure 3B:
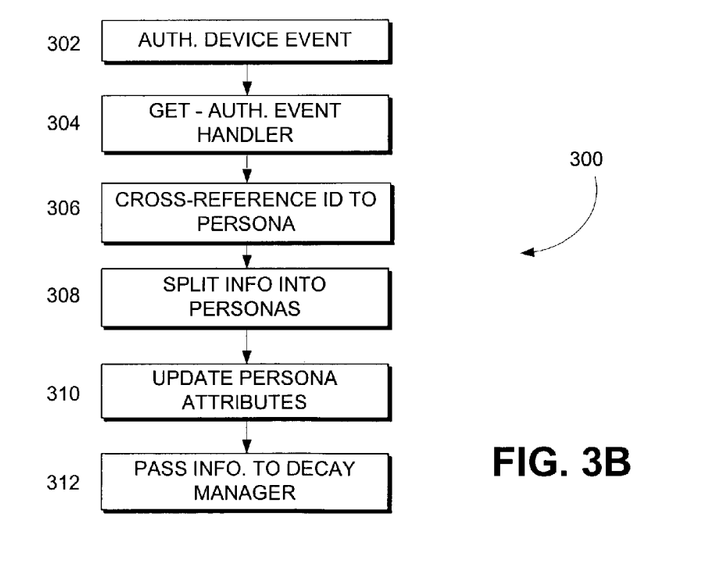
FIG. 3B is a flow diagram representing a process of handling an authentication within the present invention.

As previously mentioned, none of the information relating to the surety level is static. In fact, over time there is a slow decay of surety as shown at step 330, which also results in updates to the surety values, at step 324. The Surety Level Table 326 is updated with these dynamic surety level values. In operation, the Surety Level Table 326 is utilized by network devices 208, to permit a user access to functions or features provided by the network device. The specifics of other parameters in the Surety Level Table 326 will be discussed in conjunction with the process of Authentication 300, as shown in FIG. 3B.

The Authentication Process 300 begins with an authentication event at an Authentication Device 202 as shown at step 302. Such an event may include a login, an attempted entry into a home, or other activity that causes an individual to identify themselves to the system. The occurrence of the authentication event at step 302, results in a registration of the event through obtaining an authorization event handler, at step 304. So for example, a unique identification number is associated with an attempt by User X to identify themselves to the system. This step is followed by an attempt to classify the persona associated with the presented User X identification. IPC 214 obtains the necessary pieces of information to identify and match the persona with the login information provided by the user. A cross-reference of identification to persona is then performed at step 306. The completion of the IPC process enables an update of attributes for the relevant persona, at step 310. Updated attributes include a time stamp, an initial authorization level along with a location associated with the Authentication Device 202. The persona information along with all of the associated attributes are then stored and monitored by the Decay Event Manager 204 at step 312. At this point, Decay Event Manager 204 then monitors and decays the initial levels associated with a persona over time.

In an embodiment of the present invention, the rate of decay for a given persona surety level may also vary by the type of authentication. In other words, in addition to the fact that an iris scanner could receive a higher level of surety, it is also the case that the level associated with an iris scanned authentication could decay at a slower rate than one associated with a thumb print authentication. For example, User X is identified to the system using an iris scanner 202A and thus receives an authentication level of 99, as shown at step 314. User Y on the other hand, provides identification using a text password 202D thus receiving a surety level of 50, as shown at step 320. In one embodiment of the present invention, both authentication levels could decrease at a uniform rate, e.g. of ten percent every half hour. In another embodiment of the present invention, the authentication levels could decrease at varying rates, such that the iris scanner related level could decrease at a rate of five percent each half hour versus the text password rate of ten percent per half hour.

Figure 4A:
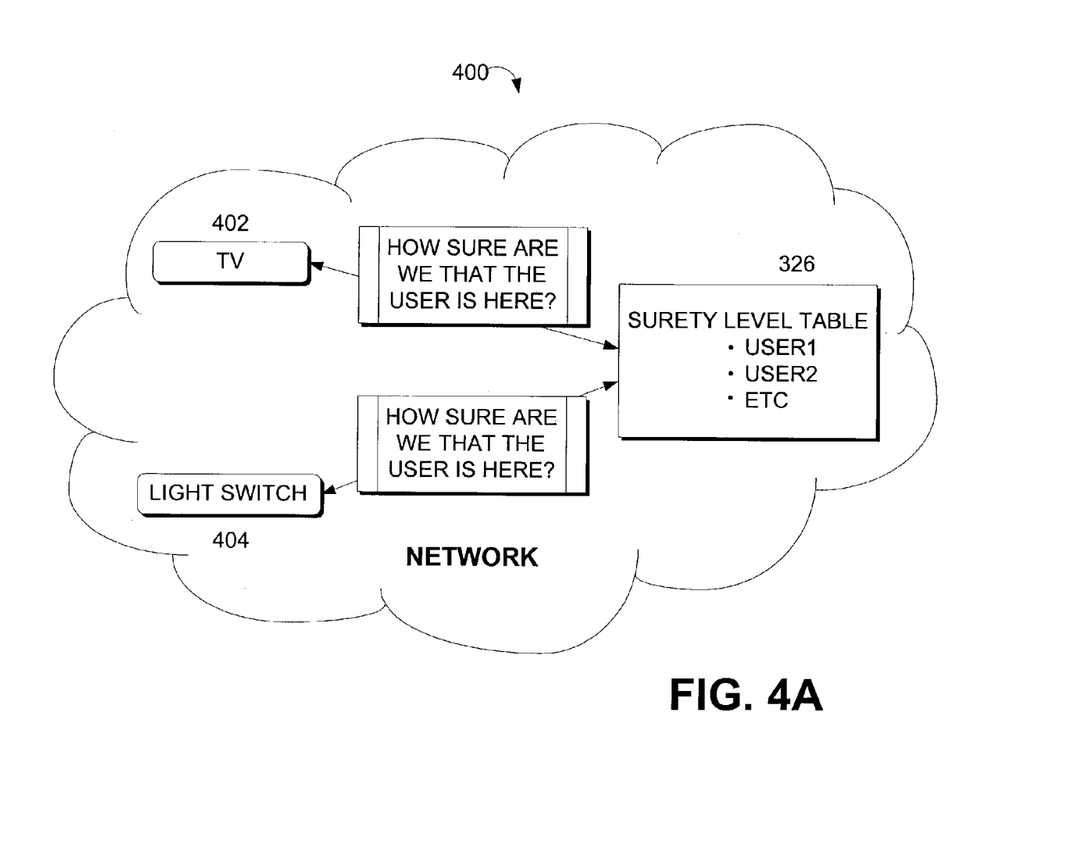
FIG. 4A is a block diagram representing the interplay of networked devices and surety level records.

The purpose of having users identify themselves to the system of the present invention is to ultimately enable them to utilize devices and features that are on the network. As such, as shown in FIG. 4A, a Network 400 could have a number of devices such as Television 402 and a Light Switch 404. When a user wishes to utilize either of these devices, the user could conventionally first go up to each device and login or identify themselves as necessary, and then attempt to use the device. On the other hand, through the sharing of network authentication provided by the system and method of the present invention, a user merely attempts to access a feature of Television 402 or Light Switch 404, since the user is already identified to the network. The attempted access prompts a determination of how certain the system is that the user is actually there. This determination is made by consulting the Surety Level Table 326.

This cursory overview of access to a client system such as Television 402 or Light Switch 404 provides a framework for a discussion on the details that are actually involved with access to any general Client Device 208. Access to a general Client Device 208 will be discussed with reference to FIG. 4B.

Figure 4B:
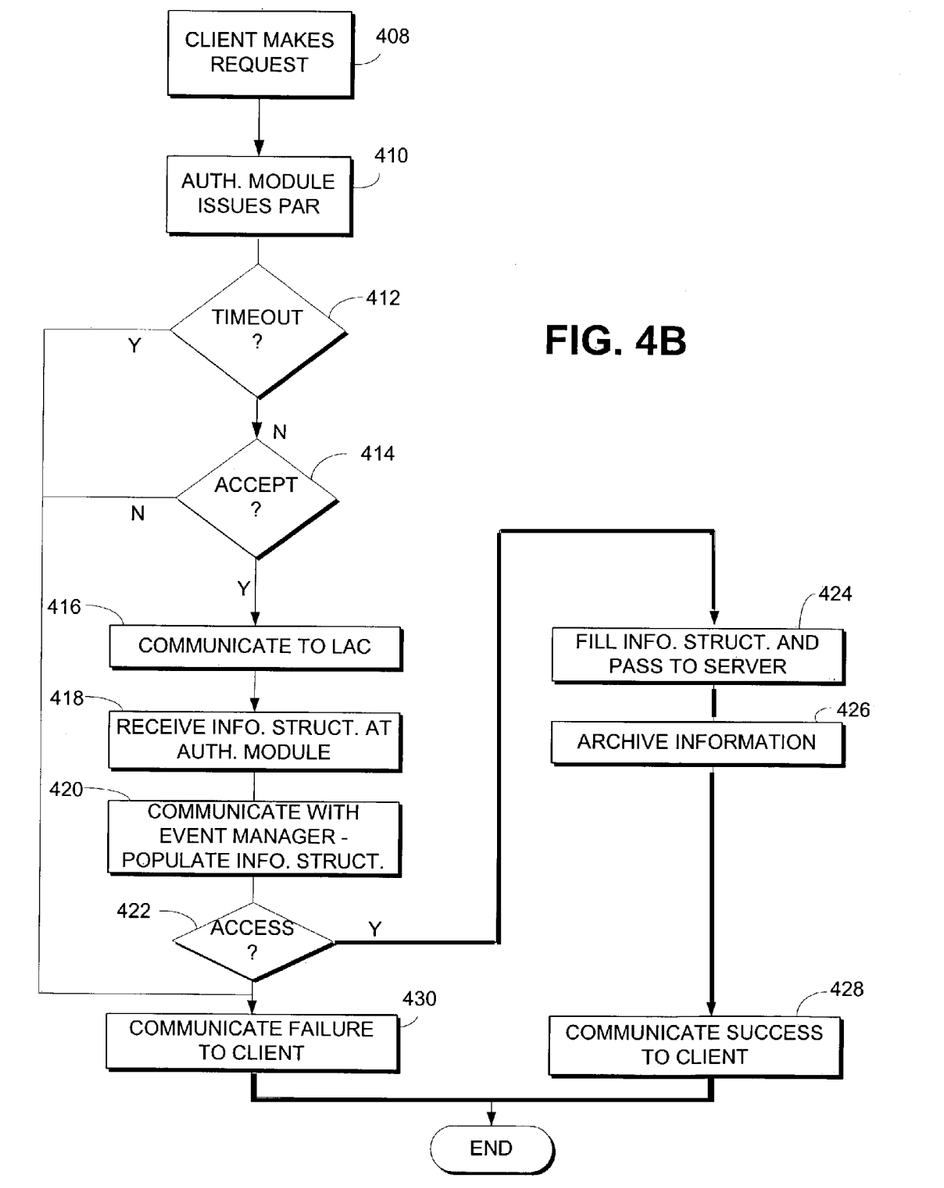
FIG. 4B is a flow diagram illustrating an exemplary process for providing a user access to a networked device within the present invention.

When a user attempts to utilize a feature or function of a Client Device 208, a request is generated by the client to the Authentication Module 206 as shown at step 408. The Authentication Module 206 then performs a Property Access Request (PAR) at step 410. A PAR is used to determine whether or not a currently identified user is able to access the particular property of the Client Device 208, based on the user's authentication surety and the required surety value for the device property. In other words, a determination must be made as to whether the Device Property 226 has a Value 228 and an associated Access Flag 232 that would enable the user to access or alter the Value 228. For example, turning to the Furnace Record 238 of FIG. 2B, when a user attempts to change the Temperature Property 226 of the Furnace Entity 224, a determination must be made as to whether or not the designated surety Value 228, in this case a value of 20, has been met by the user's authentication. In addition, the Access Flag 232 must also permit such access.

Returning to FIG. 4B, when a PAR is issued at step 410, there are a number of possible outcomes. The request could time-out, as shown at step 412, or the request could be accepted or denied as shown at step 414. In the event that the PAR times-out or is not accepted, that outcome is communicated as a lack of success back to the Client Device 208, at step 430. On the other hand, if the PAR is accepted, there is a communication with LAC 216 by the Authentication Module 206, at step 416. The purpose of the communication is to get the appropriate record from the Property Information Structure 234 as shown at step 418. As previously mentioned, this information is stored within DB1 222. A response to this request includes the various fields of the Property Information Structure 234 that were previously discussed, along with additional fields that specify personas and their associated authentication level. The persona and authentication levels that are returned are specific to the property and record of interest within the property Information Structure 234. In the current example, personas and authentication levels associated with the Temperature Property 226 or the Furnace Record 238 would be returned. In other words, a list of authorized personas is returned. This information is received at the Authentication Module 206, at step 418.

At this point, the system now has information on a Particular Property 226 along with information on the various personas that can alter or access the property. The system also has information on the required level of access for the personas. Utilizing this information, the system is then able to cross-reference this information to the particular identification of the user seeking access.

At step 420, there is a communication by the Authentication Module 206 with the Decay Event Manager 204 in order to obtain the current percentage level of the identified system user that is seeking access. If the identified user has a current access level that is within the allowed tolerance for the sought after Property 226, then access is granted at step 422. A link of the persona related information and the Property Information Structure 234 record is then made at step 424 and passed on to the Server 218. This information is archived and stored for other purposes such as audit logs, etc. at step 426. A communication is then made to the Client Device 208 at step 428, notifying the client of successful access or permitting the user to perform request that was originally made.

As can be seen, the system and method of the present invention allows for shared security information by networked devices. It also allows access to networked devices on the basis of authentication surety. The system assigns surety levels on the basis of the user authentication to the network. Even further, the present invention allows the gradual decay of user authentication, and thus access to networked devices, over time. Further still, the present invention distinguishes between individual identities and personas within the network environment.

The system and method described above enables a user to take advantage of any one of a number of devices that are connected on the network, without the need for repeated identification to each device. Any number of devices can be accessed by a single authentication to the network. Authentications are then provided to the devices as needed from the network.

Levels or degrees of surety are determined by the present invention. An authentication could relate to an individual or a persona. Through a process of identifying and classifying the method and device that is utilized for identification to the network system, a surety value is assigned to each authentication event.

The surety level associated with an authentication provides a predetermined level of access to networked devices or device features. Over time and as a function of the mode and method utilized for identification, the surety level associated with an authentication slowly decays. The decay further provides added security and diminishes the risk of fraudulent access to the network via identity theft.

As would be understood by those skilled in the art, the functions discussed herein can be performed on a client side, a server side or any combination of both. These functions could also be performed on any one or more computing devices, in a variety of combinations and configurations, and such variations are contemplated and within the scope of the present invention.

The present invention has been described in relation to particular embodiments which are intended in all respects to be illustrative rather than restrictive. Alternative embodiments will become apparent to those skilled in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated and within the scope of the claims.

We claim:

1. A method in a computing environment for maintaining security and access to a plurality of networked devices, comprising:

accepting a user identification that has been input by a user via one of a plurality of authentication devices to access a device, wherein said device is one of said plurality of networked devices;

determining a persona related to the user, wherein said persona indicates a user-role indicative of the accessibility of one or more devices in said plurality of networked devices;

storing an indication of said persona;

assigning a persona surety level to said persona, the persona surety level comprising a dynamic value indicative of the probability that the user is who the user claims to be;

applying a rate of decay to said dynamic value, wherein said rate of decay is based, in part, on the input method of the authentication device accepting the user identification and the time stamp;

assigning a surety level to said user identification, wherein said surety level depends on the input method of the authentication device accepting the user identification;

utilizing said user identification, said persona surety level, and said surety level to grant or deny access to said device; and if access to said device is denied, displaying to the user a location of another authentication device within close proximity to the device for the user to access the device.

2. A method as recited in claim 1, wherein said user identification is provided through a biometric device.

3. A method as recited in claim 2, wherein said biometric device is an iris scanner.

4. A method as recited in claim 2, wherein said biometric device is a voice recognition system.

5. A method as recited in claim 1, wherein said user identification is provided through a text password input.

6. A method as recited in claim 1, further comprising sharing said user identification and said surety level across a network.

7. A method as recited in claim 1, wherein said decay is by the length of time since the user authentication.

8. A method as recited in claim 1, wherein said surety level is aggregated across the network.

9. A method in a network environment for providing access to a plurality of networked devices, based on the network's knowledge of a user's presence, comprising:

obtaining a user identification to access a device, the user identification received by an authentication device;

assigning a surety level to the user identification, wherein the surety level depends on the input method of the authentication device accepting the identification from the user;

storing attributes associated with the user identification, wherein the attributes include, in part, a time stamp of the user identification, an indication of a geographic location associated with the authentication device, and an initial authorization level associated with the authentication device;

determining a persona related to the user based on a least one of said attributes, wherein the persona indicates a user-role indicative of the accessibility of one or more devices in the plurality of networked devices;

storing an indication of the persona;

denying the user access to the device because the authentication device is located outside of an acceptable proximity for accessing the device; and providing for display on the authentication device, a location of another authentication device within close proximity to the device for the user to access the device.

10. A method as recited in claim 9, wherein said user identification is provided through a biometric device.

11. A method as recited in claim 10, wherein said biometric device is an iris scanner.

12. A method as recited in claim 10, wherein said biometric device is a voice recognition system.

13. A method in a computing environment for providing secure access, comprising:

associating a surety value with a user identification, wherein the surety value depends on an input method of an authentication device that accepts the user identification; determining a persona related to the user, wherein said persona indicates a user-role indicative of the accessibility of one or more devices in said plurality of networked devices;

storing an indication of said persona;

assigning a persona surety level to said persona, the persona surety level comprising a dynamic value indicative of the probability that the user is who the user claims to be;

storing said dynamic value on a central database;

assigning a persona surety level to said persona, on said central database, applying a rate decay to said dynamic value, wherein said rate of decay depends on the input method of the authentication device accepting the user identification;

utilizing the surety value and the persona to provide access to one or more features of the at least one of a plurality of networked devices; and decaying the surety value over time to better secure the provided access, the rate of decay for the surety value varying by the type of user identification and the persona.

14. A method as recited in claim 13, further comprising:

accepting a subsequent user authentication; and updating said surety value in response to said subsequent user authentication.

\* \* \* \* \*

UNITED STATES PATENT AND TRADEMARK OFFICE
CERTIFICATE OF CORRECTION

| | |
|---|---|
| PATENT NO. | : 7,636,853 B2 |
| APPLICATION NO. | : 10/354589 |
| DATED | : December 22, 2009 |
| INVENTOR(S) | : Cluts et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 901 days.

Signed and Sealed this

Ninth Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,636,853 B2 | Page 1 of 1 |
| APPLICATION NO. | : 10/354589 | |
| DATED | : December 22, 2009 | |
| INVENTOR(S) | : Jonathan C. Cluts et al. | |

It is certified that error appears in the above-identified patent and that said Letters Patent is hereby corrected as shown below:

In column 14, line 1, in Claim 9, after "based on" delete "a" and insert -- at --, therefor.

In column 14, line 34, in Claim 13, after "rate" insert -- of --.

Signed and Sealed this
Eighth Day of February, 2011

David J. Kappos
*Director of the United States Patent and Trademark Office*